United States Patent [19]
Fehr et al.

[11] Patent Number: 4,953,515
[45] Date of Patent: Sep. 4, 1990

[54] DIESEL ENGINE SECONDARY FUEL INJECTION SYSTEM

[76] Inventors: William A. Fehr, 2957 Pinewood Avenue, Prince George, British Columbia, Canada, V2N 1J1; Brian G. Buck, S.S. #E, Haldi Road, Prince George, British Columbia, Canada, V2N 2S7

[21] Appl. No.: 277,083

[22] Filed: Nov. 28, 1988

[51] Int. Cl.⁵ .......................................... F02M 39/00
[52] U.S. Cl. ..................................... 123/526; 123/383; 123/387; 123/494
[58] Field of Search ............... 123/525, 383, 387, 526, 123/494

[56] References Cited

U.S. PATENT DOCUMENTS

| | | | |
|---|---|---|---|
| 2,544,978 | 3/1951 | Blessing | 123/526 |
| 2,994,187 | 8/1961 | Kelgard | 123/526 |
| 3,540,419 | 11/1970 | Fox | |
| 3,698,365 | 10/1972 | Hallberg | |
| 4,278,064 | 7/1981 | Regueiro | 123/526 |
| 4,449,509 | 5/1984 | Young | |
| 4,450,821 | 5/1984 | Venning | 123/525 |
| 4,463,734 | 8/1984 | Akeroyd | |
| 4,476,827 | 10/1984 | Basaglia | 123/526 |
| 4,505,249 | 3/1985 | Young | |
| 4,513,727 | 4/1985 | Lagano et al. | |
| 4,517,928 | 5/1985 | Wolters | 123/526 |
| 4,520,766 | 6/1985 | Akeroyd | 123/525 |
| 4,520,785 | 6/1985 | Batchelor | |
| 4,535,728 | 8/1985 | Batchelor | |
| 4,541,397 | 9/1985 | Young | |
| 4,597,364 | 7/1986 | Young | |
| 4,617,904 | 10/1986 | Pagdin | 123/525 |
| 4,632,083 | 12/1986 | Reggiani | |

*Primary Examiner*—Carl S. Miller
*Attorney, Agent, or Firm*—Nilsson, Robbins, Dalgarn, Berliner, Carson & Wurst

[57] ABSTRACT

A method of operating a diesel engine. Diesel fuel is controllably injected into the engine. An engine performance parameter such as turbo-charger boost pressure, fuel pressure in the diesel fuel injector galleries, or air intake manifold pressure, or a combination of such parameters, is monitored. A secondary fuel such as propane is injected into the engine in an amount which varies as a function of the monitored parameter(s).

3 Claims, 2 Drawing Sheets

DIESEL ENGINE SECONDARY FUEL INJECTION SYSTEM

FIELD OF THE INVENTION

This application pertains to a method of economically operating a diesel engine by fueling the engine with a mixture of diesel fuel and a secondary fuel such as propane, the relative amounts of diesel and secondary fuels being controllably varied as a function of various operating parameters.

BACKGROUND OF THE INVENTION

Diesel engine fuel systems which utilize diesel fuel as the primary fuel and a secondary fuel such as propane are well known. Conventionally, dual fuel systems of this sort are employed to increase the horsepower output by the diesel engine. As a general rule, it is undesirable to operate a diesel engine in excess of the maximum rated horsepower specified by the engine manufacturer, since this may cause damage to the engine and/or void the manufacturer's warranty coverage for the engine. Dual fuel systems are nevertheless desirable in that the price of the secondary fuel is typically less than the price of the primary diesel fuel. If a diesel engine can be operated efficiently and within the manufacturer's specifications with a dual fuel system, then significant cost savings may be realized over extended operating cycles when the combined cost of the primary and secondary fuels are taken into account. The present invention is directed to a method of economically operating a dual fuel diesel engine in a manner which optimizes the engine's performance by continually varying the relative amounts of primary and secondary fuel injected into the engine, as a function of one or more performance parameters, whilst adhering to the manufacturer's specifications for operating the engine.

SUMMARY OF THE INVENTION

In accordance with the preferred embodiment, the invention provides a method and apparatus for operating a turbo-charged diesel engine by controllably injecting pressurized diesel fuel into the engine, monitoring the boost pressure output by the engine's turbo-charger, and controllably injecting a secondary fuel such as propane into the engine in an amount which varies as a function of the monitored turbo-charger boost pressure.

Advantageously, a plurality of pressure sensors are coupled to the engine's turbo-charger. The sensors output electrical signals representative of the turbo-charger's boost pressure. An equal plurality of normally closed valves are coupled between the engine and a secondary fuel reservoir. The valves are each openable in response to an applied signal. Each sensor is adjusted to detect a selected turbo-charger boost pressure within a pre-defined pressure range. Accordingly, each sensor produces an output signal when the turbo-charger output increases to that selected pressure. The plurality of sensors together produce a plurality of output signals distributed within the pre-defined pressure range. The output signals are applied to corresponding ones of the valves, thus opening the valves in sequence as the turbo-charger boost pressure increases, and admitting a progressively increasing amount of the secondary fuel to the engine.

DETAILED DESCRIPTION OF THE PREFERRED EMBODIMENT

Figure 1:
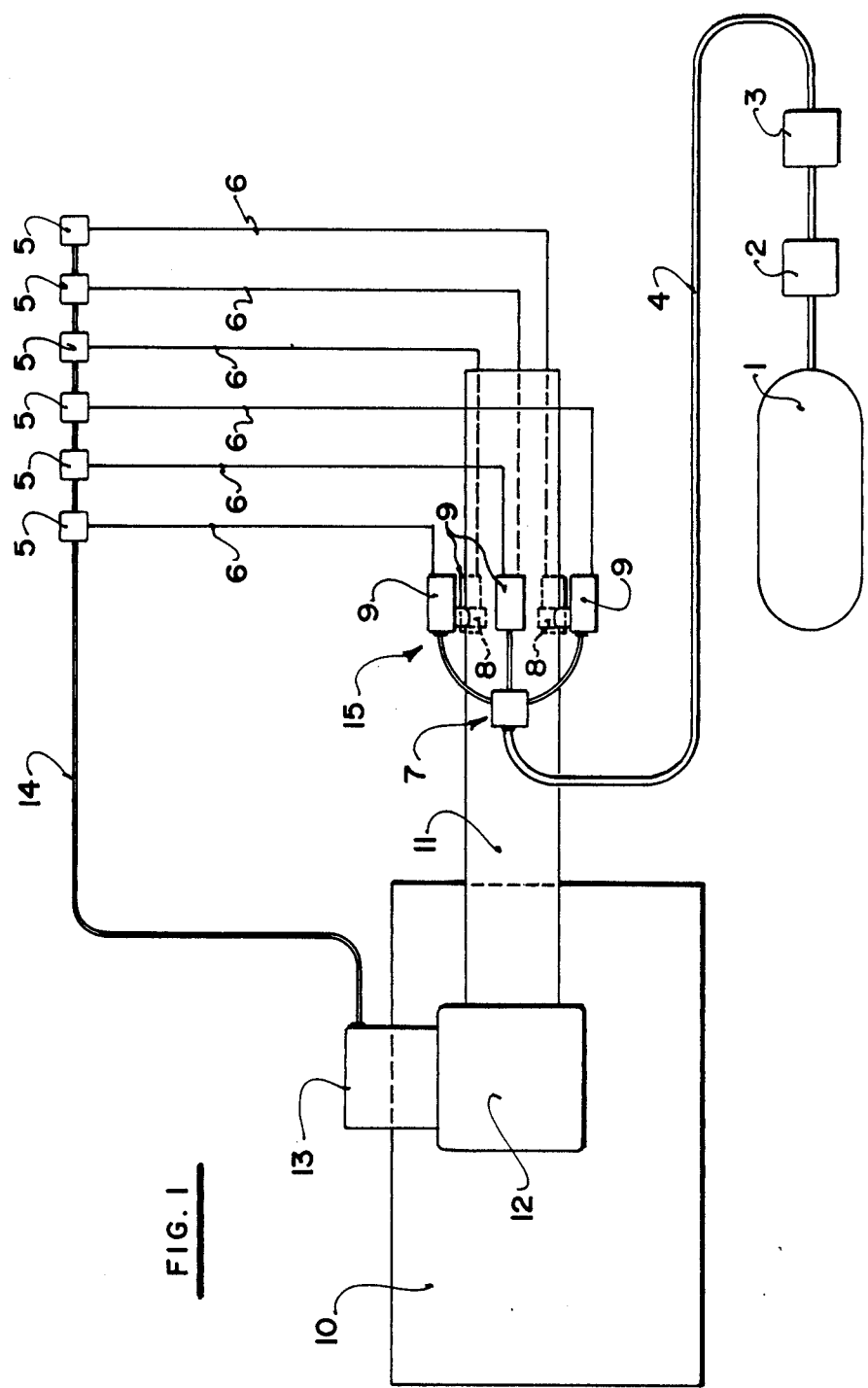
FIG. 1 is a block diagram of the basic components of a diesel engine propane injection system according to the invention.
Figure 2:
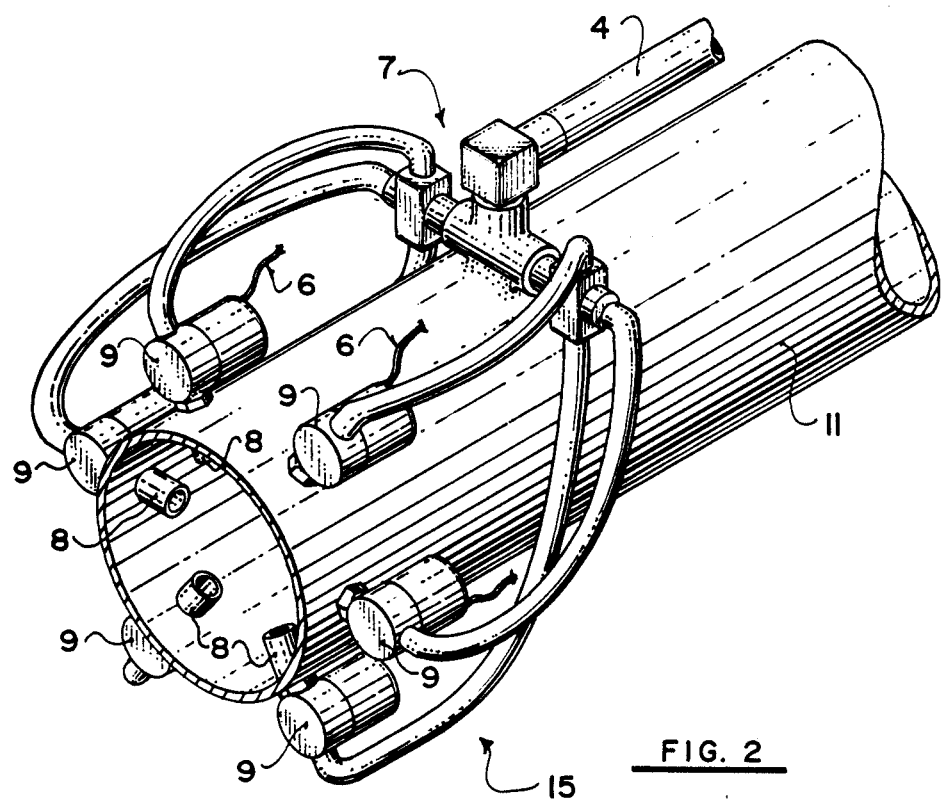
FIG. 2 is a pictorial illustration of a fuel nozzle ring for injecting propane into the air intake of a diesel engine turbo-charger.

FIG. 1 is a block diagram which illustrates the basic components of a diesel engine propane injection system constructed in accordance with the preferred embodiment of the invention. A suitable secondary fuel such as compressed propane which stored in tank 1 and is supplied, through electric lock-off device 2, vaporizer/regulator valve 3 and fuel line 4 to fuel nozzle ring 15. Fuel nozzle ring 15 is mounted in air intake pipe 11, which delivers air from the engine's air cleaner (not shown) to turbo-charger 12 mounted on diesel engine 10. Nozzle ring 15 incorporates a plurality of fuel nozzles 8 which regulate the amount of propane injected into air intake pipe 11.

One or more normally closed solenoid actuated valves 9 are provided on fuel nozzle ring 15. Propane supplied via line 4 is distributed by flow divider 7 into a number of separate lines, one coupled to each of valves 9. The outputs of each of valves 9 are coupled to one or more of injector nozzles 8. The number of valves required will vary from one application to another, depending upon the amount of propane required for injection into air intake pipe 11.

The boost pressure output by turbo-charger 12 is detected by each one of a plurality of normally open pressure sensitive switches 5. Switches 5 are coupled to air crossover 13 via hose 14. Each of switches 5 is adjusted to detect a selected turbo-charger boost pressure falling within a pre-defined turbo-charger boost pressure range. As the turbo-charger boost pressure increases to the pressure which a particular one of switches 5 has been adjusted to detect, that switch closes, thereby producing an output signal which is conveyed to a corresponding one of solenoid actuated valves 9 along one of wires 6. It will thus be understood that, by adjusting each of switches 5 to detect progressively increasing turbo-charger boost pressures, the full complement of switches will together produce a plurality of output signals distributed within the pre-defined turbo-charger boost pressure range.

In operation, as the turbo-charger boost pressure increases within the pre-defined range for which switches 5 have been adjusted, the switches close in sequence, applying their respective output signals to corresponding ones of valves 9. Application of an output signal to one of valves 9 causes that valve to open, thereby admitting propane to the nozzle(s) to which that valve is coupled, causing propane to be injected into air intake pipe 11 for delivery to engine 10. As the turbo-charger boost pressure continues to increase, additional switches close, producing further output signals which in turn open additional valves, causing further propane to be injected into air intake pipe 11 and engine 10. If the turbo-charger boost pressure increases above the pressure detected by the switch adjusted to the highest pressure setting, then all of switches 5 will be closed and all of valves 9 will be open, admitting the maximum amount of propane into air intake pipe 11 and engine 10. If the turbo-charger boost pressure decreases below the pressure detected by the switch having the highest pressure setting, then that switch will re-open and it will no longer supply an output signal to one of valves 9. The valve to which that switch is connected will accordingly close, decreasing the amount of propane injected into air intake pipe 11 and engine 10. If the turbo-charger boost pressure continues to decrease below the pressure settings of the other switches, then those switches will also re-open, causing their corresponding valves to close and further reducing the amount of propane injected into air intake pipe 11 and engine 10 until no propane is injected into air intake pipe 11. Propane injection via sequential opening and closing of valves 9 assists in maintaining a proper air/fuel mixture throughout the operating range of engine 10, which in turn enhances fuel economy, engine efficiency and pollution control.

Those skilled in the art will appreciate that although the invention has been described in the context of a diesel engine equipped with a turbo-charger, non turbo-charged engines may also benefit from the invention. For example, instead of using switches 5 to monitor the turbo-charger boost pressure, one may instead couple switches 5 to the fuel galleries which supply diesel fuel to the engine's fuel injectors so that the switches effectively monitor the fuel pressure within the fuel gallery. By adjusting the switches to close at selected pressures distributed within a pre-defined fuel pressure range, one may controllably inject propane into engine 10 in an amount which varies as a function of the monitored diesel fuel pressure. Similarly, the operation of a diesel engine may be controlled by monitoring the air pressure within the engine's air intake manifold with a bank of switches like those described above in relation to FIG. 1. The output signals produced by the switches can then be used to control the injection of propane into the engine in an amount which varies as a function of the monitored air intake manifold pressure.

Those skilled in the art will further appreciate that additional control over the operating characteristics of the engine may be attained by controlling propane injection as a function of more than one operating parameter. For example, in the case of a turbo-charged diesel engine, one may employ two separate banks of switches; the first bank being adapted to monitor the boost pressure of the engine turbo-charger as discussed above in relation to FIG. 1; the second bank being adapted to monitor the fuel pressure within the fuel injector galleries as just described. Propane may then be controllably injected into the engine in an amount which varies as a function of both the monitored diesel fuel pressure and the monitored turbo-charger boost pressure, by coupling one of the turbo-charger boost switches and one of the fuel pressure sensors to a single propane injector valve.

The invention may also be adapted to control the operation of a variety of diesel engine powered devices for maximum fuel economy. For example, to control the operation of a diesel engine powered liquid pump, one may use a bank of switches like those described above in relation to FIG. 1 to monitor the hydraulic pressure of the pumped liquid and controllably inject propane into the engine in an amount which varies as a function of the monitored hydraulic pressure. Similarly, in the case of a diesel engine powered electric generator, one may employ a bank of switches to monitor the electric current output by the generator and controllably inject propane into the engine in an amount which varies as a function of the monitored current. The operation of a diesel engine powered gas compressor may be similarly controlled by monitoring the pressure of the compressed gas and controllably injecting propane into the engine in an amount which varies as a function of the monitored gas pressure.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A method of operating a turbo-charged diesel engine, comprising the steps of:
   (a) controllably injecting pressurized diesel fuel into said engine;
   (b) coupling a plurality of pressure sensors to said engine turbo-charger, said sensors for sensing the boost pressure output of said engine turbo-charger;
   (c) coupling an equal plurality of normally closed valves between said engine and a secondary fuel reservoir, said valves being openable in response to applied signals to allow said secondary fuel to flow to said engine;
   (d) adjusting each of said sensors to detect a selected turbo-charger boost pressure within a pressure range, such that each of said sensors produces an output signal when said engine turbo-charger boost pressure is increased to said corresponding selected boost pressure, and such that said plurality of sensors together produce a plurality of output signals distributed within said pressure range; and,
   (e) applying said output signals to corresponding ones of said valves, 2. Apparatus for supplying a secondary fuel to a turbo-charged diesel engine, said apparatus comprising:
   (a) a plurality of adjustable pressure sensors coupled to said engine turbo-charger, said sensors for sensing the boost pressure output of said engine turbo-charger and for respectively producing an equal plurality of output signals representative of said boost pressure; and,
   (b) an equal plurality of normally closed valves coupled between said engine and a secondary fuel reservoir, said valves being electrically connected to corresponding ones of said pressure sensors for opening of said valves in response to said corresponding pressure sensor output signals to allow said secondary fuel to flow to said engine;
whereby adjustment of said sensors to detect selected turbo-charger boost pressures distributed within a pressure range causes said respective sensors to produce corresponding output signals when said engine turbo-charger boost pressure is increased to said corresponding selected boost pressures, thereby sequentially opening said valves as said engine turbo-charger boost pressure increases.

3. A method as defined in claim 1 or 2, wherein said secondary fuel is propane.

* * * * *